(12) United States Patent
Pfeiffer et al.

(10) Patent No.: US 11,129,697 B2
(45) Date of Patent: Sep. 28, 2021

(54) MEASURING SYSTEM AND METHOD FOR MEASURING AN IMPLANT-IMPLANT SITUATION

(71) Applicant: DENTSPLY SIRONA inc., York, PA (US)

(72) Inventors: Joachim Pfeiffer, Bensheim (DE); Frank Thiel, Ober-Ramstadt (DE)

(73) Assignee: DENTSPLY SIRONA INC., York, PA (US)

( * ) Notice: Subject to any disclaimer, the term of this patent is extended or adjusted under 35 U.S.C. 154(b) by 296 days.

(21) Appl. No.: 16/317,667

(22) PCT Filed: Jul. 21, 2017

(86) PCT No.: PCT/EP2017/068541
§ 371 (c)(1),
(2) Date: Jan. 14, 2019

(87) PCT Pub. No.: WO2018/015562
PCT Pub. Date: Jan. 25, 2018

(65) Prior Publication Data
US 2019/0282343 A1    Sep. 19, 2019

(30) Foreign Application Priority Data

Jul. 21, 2016   (DE) .......................... 102016213399.3

(51) Int. Cl.
| | | |
|---|---|---|
| *A61C 9/00* | (2006.01) | |
| *A61C 19/04* | (2006.01) | |
| *A61C 8/00* | (2006.01) | |

(52) U.S. Cl.
CPC ............ *A61C 9/0053* (2013.01); *A61C 19/04* (2013.01); *A61C 8/0001* (2013.01)

(58) Field of Classification Search
CPC ..... A61C 9/0053; A61C 19/04; A61C 8/0001; A61B 34/10; A61B 2034/108
(Continued)

(56) References Cited

U.S. PATENT DOCUMENTS 5,755,571 A * 5/1998 Companion ......... A61C 19/043
   433/72
6,885,464 B1 * 4/2005 Pfeiffer .................... A61C 9/00
   356/602

(Continued)

FOREIGN PATENT DOCUMENTS

| CN | 201034534 Y | 3/2008 |
|---|---|---|
| DE | 102001053336 A1 | 3/2013 |

(Continued)

OTHER PUBLICATIONS

International Search Report; PCT/EP2017/068541; Oct. 10, 2017 (completed); dated Oct. 23, 2017.
(Continued)

*Primary Examiner* — Yaritza Guadalupe-McCall
(74) *Attorney, Agent, or Firm* — Dentsply Sirona Inc.

(57) ABSTRACT

The invention relates to a measuring system for measuring an implant-implant situation for planning an implant-supported tooth replacement part supported on at least two implants, comprising a scanning template and the at least two set implants. The scanning template has cut-outs for the individual implants, wherein first markings are arranged on surface regions around the cut-outs.

22 Claims, 2 Drawing Sheets

(58) Field of Classification Search
USPC .......................................................... 33/514
See application file for complete search history.

(56) References Cited

U.S. PATENT DOCUMENTS

| | | | | |
|---|---|---|---|---|
| 7,010,150 | B1* | 3/2006 | Pfeiffer | A61C 9/0053 |
| | | | | 382/128 |
| 7,156,658 | B2* | 1/2007 | Shoup | A61C 19/04 |
| | | | | 33/514 |
| 7,865,259 | B2* | 1/2011 | Kuo | G06F 30/00 |
| | | | | 700/98 |
| 7,986,415 | B2* | 7/2011 | Thiel | A61C 9/0053 |
| | | | | 356/608 |
| 8,244,390 | B2* | 8/2012 | Kuo | A61C 13/0004 |
| | | | | 700/98 |
| 8,275,184 | B2 | 9/2012 | Schneider | |
| 8,334,894 | B2* | 12/2012 | Pfeiffer | G01B 11/2518 |
| | | | | 348/46 |
| 8,454,365 | B2* | 6/2013 | Boerjes | A61C 11/08 |
| | | | | 433/223 |
| 8,478,435 | B2* | 7/2013 | Kuo | G06F 30/00 |
| | | | | 700/98 |
| 8,830,303 | B2* | 9/2014 | Pfeiffer | G06T 7/521 |
| | | | | 348/46 |
| 8,869,410 | B1* | 10/2014 | Callahan | A61C 7/146 |
| | | | | 33/41.4 |
| 9,208,531 | B2* | 12/2015 | Boerjes | A61C 9/0046 |
| 9,421,074 | B2* | 8/2016 | Sachdeva | A61B 5/4547 |
| 9,456,754 | B2* | 10/2016 | Kocherscheidt | A61B 5/0088 |
| 9,462,993 | B2* | 10/2016 | Popilka | A61C 19/04 |
| 9,978,172 | B2* | 5/2018 | Adamson | G06T 15/20 |
| 9,980,651 | B2* | 5/2018 | Pfeiffer | A61B 5/4547 |
| 10,080,636 | B2* | 9/2018 | Thiel | A61C 9/0073 |
| 10,282,489 | B2* | 5/2019 | Fisker | G05B 19/4097 |
| 10,390,693 | B2* | 8/2019 | Adamson | G01B 9/0203 |
| 10,413,385 | B2* | 9/2019 | Sherwood | A61C 7/002 |
| 2004/0197727 | A1* | 10/2004 | Sachdeva | A61C 13/0004 |
| | | | | 433/24 |
| 2005/0271996 | A1* | 12/2005 | Sporbert | A61C 7/00 |
| | | | | 433/24 |
| 2006/0019219 | A1 | 1/2006 | Saliger | |
| 2007/0196782 | A1* | 8/2007 | Noguchi | A61C 11/02 |
| | | | | 433/56 |
| 2007/0238065 | A1* | 10/2007 | Sherwood | G16H 50/50 |
| | | | | 433/24 |
| 2009/0148809 | A1* | 6/2009 | Kuo | A61C 13/0004 |
| | | | | 433/68 |
| 2012/0015316 | A1* | 1/2012 | Sachdeva | A61C 5/77 |
| | | | | 433/24 |
| 2012/0231421 | A1* | 9/2012 | Boerjes | A61C 13/0022 |
| | | | | 433/223 |
| 2012/0290115 | A1* | 11/2012 | Kuo | A61C 13/0004 |
| | | | | 700/98 |
| 2013/0108988 | A1* | 5/2013 | Simoncic | A61C 13/0004 |
| | | | | 433/192 |
| 2014/0104406 | A1* | 4/2014 | Pfeiffer | A61B 5/0088 |
| | | | | 348/77 |
| 2014/0146142 | A1* | 5/2014 | Duret | A61B 1/00158 |
| | | | | 348/47 |
| 2014/0177931 | A1* | 6/2014 | Kocherscheidt | G06T 7/0012 |
| | | | | 382/128 |
| 2014/0365140 | A1* | 12/2014 | Popilka | A61C 19/04 |
| | | | | 702/19 |
| 2015/0072313 | A1* | 3/2015 | Thiel | A61C 9/0073 |
| | | | | 433/214 |
| 2015/0235412 | A1* | 8/2015 | Adamson | G06T 7/344 |
| | | | | 382/154 |
| 2015/0359614 | A1* | 12/2015 | Sachdeva | A61B 6/032 |
| | | | | 433/8 |
| 2018/0042707 | A1 | 2/2018 | Schnitzspan | |
| 2018/0078128 | A1* | 3/2018 | Adamson | G01B 9/0203 |
| 2019/0282343 | A1* | 9/2019 | Pfeiffer | A61C 19/04 |
| 2020/0253692 | A1* | 8/2020 | Hajjar | A61C 13/0022 |
| 2020/0360109 | A1* | 11/2020 | Gao | G06T 19/20 |

FOREIGN PATENT DOCUMENTS

| | | |
|---|---|---|
| EP | 2177175 A1 | 4/2010 |
| GB | 775876 A | 5/1957 |

OTHER PUBLICATIONS

International Preliminary Report on Patentability (IPRP) Chapter I; PCT/EP2017068541; dated Jan. 22, 2019.
Written Opinion of the International Searching Authority; PCT/EP2017/068541; Oct. 10, 2017 (completed); dated Oct. 23, 2017.

* cited by examiner

MEASURING SYSTEM AND METHOD FOR MEASURING AN IMPLANT-IMPLANT SITUATION

TECHNICAL FIELD

The invention relates to a measuring system and method for measuring an implant-implant situation for planning an implant-supported tooth replacement part supported on at least two implants, comprising a scanning template and the at least two set implants.

BACKGROUND OF THE INVENTION

A number of methods and apparatuses for measuring a tooth situation are known in the state of the art.

DE 10 2012 207 499 B3 discloses a method for measuring a tooth situation comprising a plurality of implants, wherein the overall tooth situation is captured using a first measurement method, wherein defined object regions around the implants are subsequently measured by means of a second more precise measurement method. The second more precise measurement method can be carried out with the aid of a multi-camera system using a photogrammetry method. Measurement bodies having measurement geometries that allow a determination of the position and orientation of the implants can be used to improve the measurement. In doing so, the measurement geometry can exhibit a specific geometric shape. The first measurement method for the overview image can be based on a fringe projection method, on a confocal microscopy method, on a white light interferometry method, on a triangulation method with colored patterns or on a three-dimensional X-ray imaging method.

DE 10 2004 035 091 A1 discloses a method for determining the position and orientation of the dental implants, wherein a measurement geometry is placed onto the implant from which the position and orientation of the implant can be inferred.

One disadvantage of these methods is that the accuracy of the used measurement methods, in particular for determining the implant-implant situation, i.e. the relative position and orientation of the implants relative to one another, is inadequate.

The object of the present invention is therefore to provide a measuring system and a method for measuring an implant-implant situation for use in the planning of an implant-supported tooth replacement part, which allows precise measurement and determination of the implant-implant situation.

SUMMARY OF THE INVENTION

The invention relates to a measuring system for measuring an implant-implant situation for planning an implant-supported tooth replacement part supported on at least two implants, comprising a scanning template and the at least two set implants. The scanning template comprises cut-outs for the individual implants and first markings.

The measuring system is used for the precise measurement of the implant-implant situation. The implant-implant situation is defined as the position and orientation of the implants relative to one another and/or relative to a tooth situation. The implant-supported tooth replacement part can, for example, be an implant-supported bridge, an implant-supported bridge with an integrated gingival component or an implant-supported crosspiece. An implant-supported crosspiece serves as a base structure for crosspiece-supported, removable dentures. The tooth replacement part is supported on at least two implants, so that a determination of the position and orientation of the two implants relative to one another that is as accurate as possible is essential for planning the implant-supported tooth replacement part. The scanning template is similar to a drilling template, wherein, for the measurement, the scanning template is placed onto the set implants and is subsequently measured together with the implants. Said scanning template can be produced from a dimensionally stable material such as PMMA, for example, using a CAD/CAM production method. The cut-outs on the scanning template can be larger than the implants, so that the scanning template placed onto the implants can easily be moved back and forth. The cut-outs are therefore placed at the positions of the implants that were defined prior to setting the implants, for example when designing a drilling template. The actual positions of the implants deviate from the planned positions, however, because slight deviations from the planned positions can occur during the setting of the implants and as a result of possible errors in the production of the drilling template. The present measuring system thus provides a fine-tuned measurement, to measure the precise position and orientation of the implants relative to one another and relative to the tooth situation. In terms of their shape and their color design, the first markings are configured such that the position and orientation of the markings can be uniquely determined.

The first markings can be three punctiform elevations, for example, which are arranged in a triangle. Markings can also be other measurement geometries consisting of geometric basic shapes, such as a cuboid. The edge of the cut-out can itself serve as the first marking. This is because the position and orientation can be uniquely determined by means of a profile of the edge of the cut-out.

One advantage of such a measuring system is that the determination of the position and orientation of the implants relative to one another and of the implants relative to the tooth situation is improved. For typical three-dimensional intraoral cameras based on an optical three-dimensional measurement method, such as a fringe projection method, the accuracy of the measurement of weakly structured larger areas is typically between 50 µm and 100 µm. For the optical measurement of cooperative profiles, this accuracy of the measurement drops to a few µm within a small distance. The position and orientation of the first markings relative to the nearby implant can therefore be determined with much greater accuracy than when using a three-dimensional optical measurement of the overall tooth situation.

Another advantage of such a measuring system is that the mechanical precision of the scanning template is higher than the measurement accuracy of a conventional optical 3D camera. Consequently, in particular the relative position of the cut-outs is measured more accurately. This is in particular the case if there are only gums between the set implants. This is because, with a measurement using a conventional 3D camera, the absence of characteristic geometric structures in the recording region can lead to higher registration errors and thus to measurement inaccuracies.

It is assumed that the positional relationship between the first markings associated with the implants in the scanning template amongst one another has been produced with a precision that is higher than the precision of typical 3D measuring cameras for the measurement of weakly structured, larger areas. For a machining production of the scanning template on an NC-controlled processing machine this is typically a given.

The first markings can advantageously be disposed on surface regions around the cut-outs.

The surface regions with the markings can be disposed directly at the edge of the cut-outs or near the cut-outs, for example, at a distance of no more than 5 mm from the edge of the cut-out.

The first markings can advantageously be formed by the edges of the cut-outs.

This is because the geometry of the edges of the cut-outs permits a unique determination of the position and orientation of the scanning template.

The first markings can advantageously be configured as barcodes for allocating the individual cut-outs.

The barcodes can be detected optically and permit a unique identification of the individual cut-outs. It is therefore possible to automatically determine for which implants the precise position and orientation has been measured. Due to their geometry, the barcodes also allow a precise determination of the position and orientation of the scanning template.

The measuring system can advantageously additionally comprise at least two scan bodies attached to the two implants, wherein second markings are disposed on the scan bodies.

The scan bodies attached to the implants thus comprise second markings, which make a more accurate determination of the position and orientation of the scan bodies relative to the scanning template possible. Like the first markings, the second markings can be configured as needed to facilitate a unique determination of the position and orientation.

An abutment or a titanium base, which can be measured by means of an optical 3D camera to facilitate a precise determination of the position and orientation relative to the scanning template, can alternatively be used instead of a scan body.

The scanning template can advantageously be produced with known dimensions using a CAD/CAM production method.

The scanning template can therefore be created like a drilling template by means of a conventional CAD/CAM device. The scanning template can be produced from a blank, for example by means of a five-axis CAM milling machine. Production thus takes place according to a planned 3D model with known dimensions. The dimensions of the produced scanning template are therefore known within a tolerance range.

In terms of their geometry and/or their color, the first markings and/or the second markings can advantageously be designed such that a precise position and orientation of the first markings relative to the second markings can be determined by using a three-dimensional optical measurement method.

A unique and precise measurement of the markings is thus made possible.

A diameter of a cut-out can advantageously be larger than a diameter of the corresponding implant.

The scanning template can thus be placed onto the implants, even if the actual positions of the set implants deviate from the planned positions of the implants.

The scanning template can advantageously be made of a dimensionally stable material, such as PMMA.

As a result, the scanning template is not deformed when it is placed onto the implants, so that the known dimensions of the scanning template correspond to the actual dimensions of the scanning template.

The invention further relates to a method for measuring an implant-implant situation for planning an implant-supported tooth replacement part using the abovementioned scanning template. The scanning template is fixedly positioned relative to the set implants, and the first markings are on the scanning template measured by using a measurement method.

Therefore, using the scanning template, this method makes a precise and unambiguous measurement of the position and the orientation of the implants relative to one another and relative to the tooth situation possible. The tooth situation can encompass the adjacent teeth, gingival regions and/or tooth replacement parts. The measurement method can be any measurement method that permits a unique and precise determination of the position and orientation of the first markings relative to the implants. The measurement method can, for example, be a fringe projection method, a confocal microscopy method, a white light interferometry method, a triangulation method with colored patterns, a tactile method using a tactile scanner or a three-dimensional X-ray imaging method.

The positioning of the scanning template relative to the set implants can be carried out, for example, by gluing the scanning template to the surfaces of the teeth around the set implants and/or by gluing the scanning template to the set implants and/or by screwing the scanning template to the set implants and/or by fastening the scanning template to a jawbone using fixation implants.

Visible surfaces of the implants or structures attached thereto can advantageously also be measured by using the measurement method, wherein a precise position and orientation of the scanning template relative to the implants is determined.

The relative position and orientation of the scanning template relative to the implants is thus determined without using scan bodies.

Scan bodies comprising second markings can advantageously be attached to the implants, wherein the second markings on the scan bodies are measured using the measurement method, wherein a precise position and orientation of the scanning template relative to the scan bodies and thus to the implants is determined.

Consequently, the determination of the position and orientation of the implants relative to the scanning template is improved by using the scan bodies. This is because the scan bodies comprise the second markings, which, for example with respect to geometry and optical properties, are suitable for an optical measurement.

A precise position and orientation of the implants relative to one another and/or relative to a tooth situation can advantageously be determined using the determined position and orientation of the scanning template relative to the set implants and using the known dimensions of the scanning template.

As a result, the implant-implant situation is determined with much greater accuracy than when using conventional methods. When using a conventional three-dimensional optical measurement of the overall tooth situation with a plurality of set implants, registration errors and measurement errors, for example, can result in inaccuracies.

The determined position and orientation of the implants relative to one another and/or relative to a tooth situation can advantageously be used for planning the implant-supported tooth replacement part.

The fitting accuracy of the tooth replacement part to be produced to the set implants is thus improved.

The measurement method can advantageously be an optical three-dimensional measurement method or a tactile measurement method.

The optical three-dimensional measurement method, such as a fringe projection method, a confocal microscopy method or a white light interferometry method, is particularly advantageous for an intraoral measurement. A tactile measurement method uses a tactile scanner, which scans the surface of the object in a point-by-point manner and thus generates a three-dimensional point cloud of the object. The measurement method can also be a photogrammetry method.

The photogrammetry method is a measurement method and an evaluation method for remote sensing, which is used to determine the spatial position or three-dimensional shape of an object from images and exact survey photographs of said object taken from different spatial directions. The images are typically recorded using a special multi-camera system. Using this method, a three-dimensional image of the object to be recorded can be calculated from the two-dimensional optical images taken by the individual cameras of the multi-camera system.

The scanning template can advantageously be produced with known dimensions using a CAD/CAM production method.

The scanning template is thus produced using a CAD/CAM device according to a planned 3D model with known dimensions.

The scanning template can advantageously be produced from a drilling template previously used to set the implants, wherein drill sleeves are removed from the drilling template and/or the cut-outs are made, wherein the first markings are placed on the surface regions around the cut-outs.

The scanning template is thus produced from the drilling template previously used for drilling the implant bores.

The creation of the cut-outs and the first markings can advantageously be carried out using the CAD/CAM production method.

The drilling template is thus automatically adapted using a CAD/CAM device, by creating the cut-outs and the first markings.

BRIEF DESCRIPTION OF THE DRAWINGS

The invention is explained with reference to the drawings. The drawings show.

DETAILED DESCRIPTION OF THE INVENTION

Figure 1:
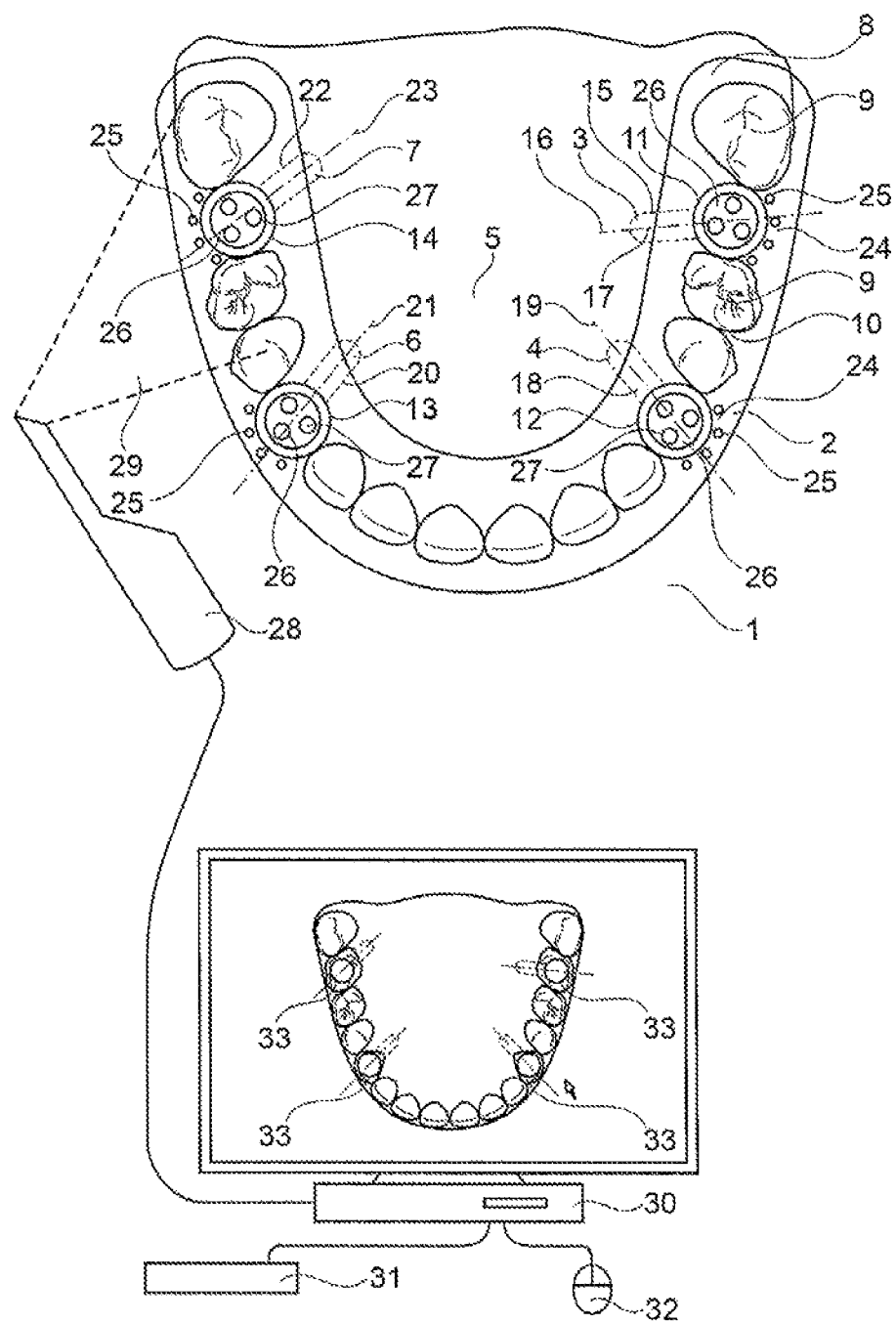
FIG. 1 a sketch to illustrate a measuring system.

FIG. 1 shows a sketch to illustrate a measuring system 1 comprising a scanning template 2 and at least two set implants 3 and 4 for measuring an implant-implant situation 5. In the present case, a third implant 6 and a fourth implant 7 were additionally set. The present method using the measuring system 1 thus makes a fine-tuned measurement of the position and orientation of the set implants 4, 3, 7 and 6 relative to one another and relative to the rest of the tooth situation 8 possible, wherein the tooth situation 8 comprises adjacent teeth 9 and gingival regions 10. The scanning template 2 is placed onto the implants 3, 4, 6 and 7, wherein a first cut-out 11, a second cut-out 12, a third cut-out 13 and a fourth cut-out 14 are disposed at the positions of the implants. The first implant 3 therefore has a first position 15 and a first orientation 16 along an axis of symmetry 17 of the implant 4. The second implant 4 has a second position 18 and a second orientation 19. The third implant 6 has a third position 20 and a third orientation 21. The fourth implant 7 has a fourth position 22 and a fourth orientation 23. First markings 25 are disposed on the surface regions 24 around the cut-outs 11, 12, 13 and 14. Scan bodies 26, which have second markings 27, are attached to the implants 3, 4, 6 and 7. In terms of their geometry, in terms of their color design and in terms of their optical properties, the second markings 27 and the first markings 25 can be designed such that a precise and unambiguous measurement of the position of said markings is made possible. In the present case, the second markings 27 are designed in the form of three hemispherical elevations which are arranged in a triangle. The first markings 25 are likewise designed as hemispherical elevations. The markings can also have other geometric basic shapes, such as a pyramid or a cuboid. The scanning template 2 can, for example, be produced by means of a CAD/CAM device according to a 3D model. Surface data of the tooth situation 8, including adjacent teeth 9, and the positions of the implants 3, 4, 6 and 7 known from the planning of the implant, for example, can be used in the planning of the scanning template. The diameters of the cut-outs 11, 12, 13 and 14 are greater than the diameter of the set implants 3, 4, 6 and 7 and the attached scan bodies 26. The scanning template 2 and the scan bodies 26 attached to the implants are measured using an intraoral 3D camera 28 based, for example, on a fringe projection method. A recording region 29, which is represented by the dashed lines, is therefore measured using the intraoral 3D camera 28. The recording region 29 of the 3D camera 28 thus includes both the first markings 25 of the scanning template 2 as well as the second markings 27 of the scan body 26, so that, with the three-dimensional optical recording, a precise determination of the position and orientation of the first markings 25 relative to the second markings 27 is made possible. The image data of the three-dimensional optical recording of the 3D camera 28 are forwarded to a computer 30. Operating elements, such as a keyboard 31 and a mouse 32, are connected to the computer 30. The determined position and orientation of the implants 3, 4, 6 and 7 relative to one another and relative to the tooth situation 8 are used to plan an implant-supported tooth replacement part 33. Therefore, to plan the tooth replacement part 33, the outer geometry is planned to match the adjacent teeth 9 and an inner geometry is planned as a function of the precise position and orientation of the set implants.

Figure 2:
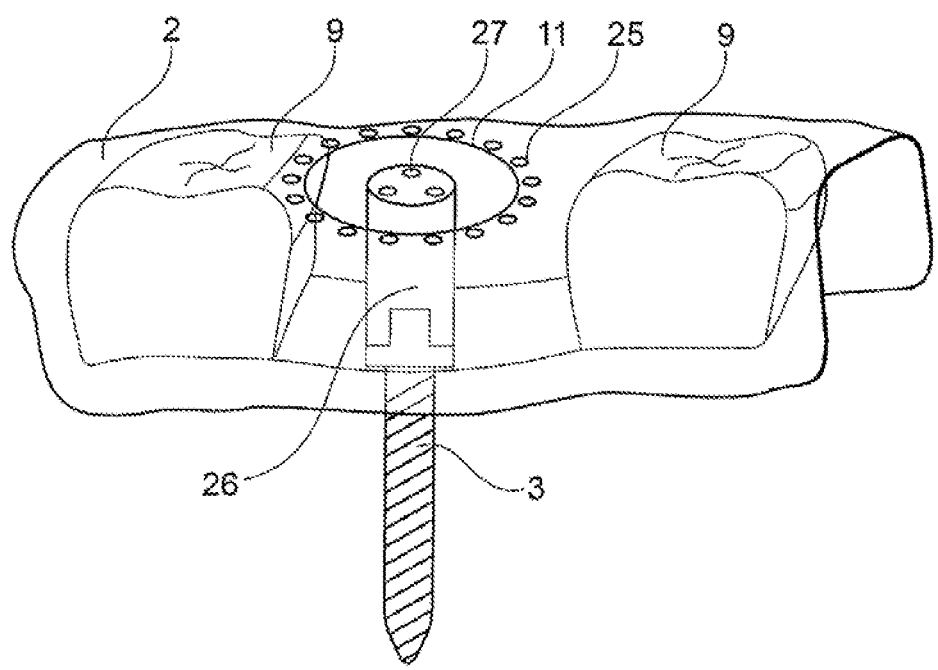
FIG. 2 a side view of a detail of the scanning template.

FIG. 2 shows a side view of a detail of the scanning template 2, which is placed onto the adjacent teeth 9. The scan body 26 with the second markings 27 is disposed on the first implant 3, wherein the diameter of the cut-out 11 is greater than the diameter of the scan body 26. The first markings 25 are hemispherical elevations arranged in a ring-like manner around the edge of the cut-out 11.

REFERENCE SIGNS 1 measuring system
2 scanning template
3 first implant
4 second implant
5 implant-implant situation
6 third implant
7 fourth implant
8 tooth situation
9 adjacent teeth
10 gingival regions 11 first cut-out
12 second cut-out
13 third cut-out
14 fourth cut-out
15 first position
16 first orientation
17 axis of symmetry
18 second position
19 second orientation
20 third position
21 third orientation
22 fourth position
23 fourth orientation
24 surface regions
25 first markings
26 scan body
27 second markings
28 intraoral 3D camera
29 recording region
30 computer
31 keyboard
32 mouse
33 tooth replacement part

The invention claimed is:

1. Measuring system comprising:
a physical scanning template; and
at least two set implants,
wherein the physical scanning template includes (i) cut-outs for the at least two set implants and (ii) first markings; such that dimensions of the physical scanning template allow for the measurement of a position and an orientation of the at least two set implants relative to one another and/or relative to a tooth situation in order to plan an implant-supported tooth replacement part supported on the at least two set implants.

2. Measuring system according to claim 1, wherein the first markings are disposed on surface regions around the cut-outs.

3. Measuring system according to claim 1, wherein the first markings are formed by the edges of the cut-outs.

4. Measuring system according to claim 1, wherein the first markings are included as barcodes for allocating the individual cut-outs.

5. Measuring system according to claim 1, wherein the measuring system further comprises at least two scan bodies attached to the at least two set implants, wherein second markings are disposed on the scan bodies.

6. Measuring system according to claim 1, wherein the physical scanning template is produced with known dimensions using a CAD/CAM production method.

7. Measuring system according to claim 1, wherein the first markings and/or the second markings include an indicia selected from the group consisting of a specific geometry and color.

8. Measuring system according to claim 1, wherein a diameter of a cut-out is greater than a diameter of a corresponding implant.

9. Measuring system according to claim 1, wherein the physical scanning template is made of a dimensionally stable material.

10. Method for measuring an implant-implant situation for planning an implant-supported tooth replacement part using the physical scanning template according to claim 1, comprising the step of measuring the first markings on the physical scanning template using a measurement method wherein the physical scanning template is fixedly positioned relative to the at least two set implants.

11. Method according to claim 10, further comprising the step of measuring visible surfaces of the at least two set implants or structures attached thereto, wherein a precise position and orientation of the physical scanning template relative to the at least two set implants is determined.

12. Method according to claim 10, further comprising the step of measuring second markings on the scan bodies wherein the scan bodies are attached to the at least two set implants, wherein a precise position and orientation of the physical scanning template relative to the scan bodies and thus to the at least two set implants is determined.

13. Method according to claim 10, wherein on the basis of the determined position and orientation of the physical scanning template relative to the at least two set implants as well as on the basis of known dimensions of the physical scanning template, a precise position and orientation of the at least two set implants relative to one another and/or relative to a tooth situation is determined.

14. Method according to claim 13, wherein the determined position and orientation of the at least two set implants relative to one another and/or relative to a tooth situation are used for planning the implant-supported tooth replacement part.

15. Method according to claim 10, wherein the measurement method is an optical three-dimensional measurement method or a tactile measurement method.

16. Method according to claim 10, wherein the physical scanning template is produced with known dimensions using a CAD/CAM production method.

17. Method according to claim 10, wherein the physical scanning template is produced from a drilling template previously used to set the at least two set implants, wherein drill sleeves are removed from the drilling template and/or the cut-outs are made, wherein the first markings are placed on the surface regions around the cut-outs or the edges of the cut-outs are used as markings.

18. Method according to claim 17, wherein the cut-outs and the first markings are created by using the CAD/CAM production method.

19. A physical scanning template for measuring an implant-implant situation for planning an implant-supported tooth replacement part supported on at least two implants, wherein the physical scanning template comprises (i) cut-outs for the individual implants and (ii) first markings, such that dimensions of the physical scanning template allow for the measurement of a position and an orientation of the at least two set implants relative to one another and/or relative to a tooth situation in order to plan an implant-supported tooth replacement part supported on the at least two set implants.

20. Physical scanning template according to claim 19, wherein the first markings are disposed on surface regions around the cut-outs.

21. Physical scanning template according to claim 19, wherein the first markings are formed by the edges of the cut-outs.

22. Physical scanning template according to claim 19, wherein the first markings are configured as barcodes for allocating the individual cut-outs.

* * * * *